Patented Oct. 4, 1932

1,880,419

UNITED STATES PATENT OFFICE

ROBERT L. CHURCHILL, OF ROCHESTER, NEW YORK, ASSIGNOR TO EASTMAN KODAK COMPANY, OF ROCHESTER, NEW YORK, A CORPORATION OF NEW YORK

CRYSTALLIZING LACQUER COMPRISING TRIBROMO ANISOLE

No Drawing. Application filed January 13, 1932. Serial No. 586,461.

This invention relates to the type of coating compositions known as crystallizing lacquers, and has for its object to provide a crystallizing agent for such lacquers or for other cellulose ester compositions.

In recent years a new type of finish has been developed, known as crystallizing lacquer. The lacquers of this type are cellulose ester lacquers containing a substance which, when the lacquer dries, crystallizes out to produce a lustrous, pearly effect which is very pleasing to the eye. The crystallizing agent is a substance of low solubility in the solvent or solvent mixture used in the lacquer, so that as the solvent evaporates the substance crystallizes out. The crystal form is characteristic of the substance used as crystallizing agent. In order to give a beautiful effect, the crystal form should be well defined, and the crystals should impart a soft sheen to the lacquer coating. At the same time, the crystallizing agent should be such as will not seriously impair the qualities usually required in a lacquer, particularly good adhesion.

I have discovered that $2:4:6$-tribromo anisole is a satisfactory crystallizing agent for use in cellulose ester lacquers, such as cellulose acetate lacquers. In carrying out my invention I may proceed as follows. Ten parts by weight of a low-viscosity cellulose acetate are dissolved in a solvent mixture made up of 50% acetone, 20% ethyl lactate, 15% ethyl acetate, and 15% toluene. Ten parts by weight of $2:4:6$-tribromo anisole are dissolved in this solution. If desired, a dye may be incorporated into the solution to give a tinted lacquer. For instance, rhodamine 6G incorporated into the lacquer results in very attractive coatings.

It will be understood that the above example is merely illustrative, and that I am not limited by it. I may vary the proportions of any or all of the components of the lacquer, or I may use other components in place of some of those given in the example. For instance, in place of acetone, I may use a mixture of ethylene chloride and alcohol. In place of ethyl lactate, ethyl acetate and toluene, I may use other substances which perform the same functions in a lacquer. While I have shown 10 parts of $2:4:6$-tribromo anisole, I may use from $2\frac{1}{2}$ to 15 parts, approximately, per 10 parts by weight of cellulose acetate.

Moreover, my novel crystallizing agent is useful not only in lacquers, but in cellulose acetate sheets. Such sheets may be coated from a solution of cellulose acetate and $2:4:6$-tribromo anisole in acetone or a mixture of ethylene chloride and alcohol. The crystallizing agent may be used in the same relative proportions as those given above, namely, from 25 to 150 parts by weight per 100 parts by weight of cellulose acetate. The amount of solvent is so chosen as to give a dope of the desired viscosity as is well known in the art. The cellulose acetate used in the manufacture of sheets need not be of the low-viscosity variety preferred for lacquer manufacture. Cellulose acetate sheets containing my novel crystallizing agent are useful in the manufacture of toilet articles and other ornamental objects.

What I claim as my invention and desire to be secured by Letters Patent of the United States is:

1. A composition of matter comprising cellulose acetate and $2:4:6$-tribromo anisole.
2. A crystallizing lacquer comprising cellulose acetate and $2:4:6$-tribromo anisole.
3. A cellulose acetate sheet comprising crystallized $2:4:6$-tribromo anisole.
4. A composition of matter comprising 100 parts by weight of cellulose acetate and approximately 25 to 150 parts by weight of $2:4:6$-tribromo anisole.

Signed at Rochester, New York, this 6th day of January, 1932.

ROBERT L. CHURCHILL.